United States Patent
Inagaki et al.

[11] Patent Number: 6,163,398
[45] Date of Patent: Dec. 19, 2000

[54] DISPERSION COMPENSATING FIBER AND OPTICAL AMPLIFIER USING SAME

[75] Inventors: Shinya Inagaki; Keiko Takeda, both of Kawasaki, Japan

[73] Assignee: Fujitsu Limited, Kawasaki, Japan

[21] Appl. No.: 09/111,771

[22] Filed: Jul. 8, 1998

[30] Foreign Application Priority Data

Feb. 23, 1998 [JP] Japan ................ 10-040188

[51] Int. Cl.[7] ....................................... H01S 3/00
[52] U.S. Cl. ........................ 359/341; 359/124; 359/161
[58] Field of Search ........................ 359/341, 124, 359/161

[56] References Cited

U.S. PATENT DOCUMENTS

| | | |
|---|---|---|
| 5,361,319 | 11/1994 | Antos et al. . |
| 5,887,093 | 3/1999 | Hansen et al. ............... 385/27 |
| 5,995,694 | 11/1999 | Akasaka et al. ............ 385/123 |
| 6,031,955 | 2/2000 | Muhasa et al. ............ 385/123 |

FOREIGN PATENT DOCUMENTS

| | | |
|---|---|---|
| 3-211530 | 9/1991 | Japan . |
| 0820258 | 8/1996 | Japan . |
| 9-197131 | 7/1997 | Japan . |

*Primary Examiner*—Mark Hellner
*Attorney, Agent, or Firm*—Staas & Halsey, LLP

[57] ABSTRACT

With a dispersion compensating fiber 1, a dispersion compensating fiber material having a dispersion characteristic which is opposite to a dispersion characteristic of an optical transmission path, is formed with a rare-earth element doped region limited to an output side predetermined range of the full length of the fiber, while an input side region $1n$ is not doped with a rare-earth element. Due to this construction, signal light is amplified inside the doped region $1d$ even with low power excitation light, so that insertion losses in the dispersion compensating fiber are compensated. Moreover, by providing the dispersion compensating fiber between two stage optical amplifying sections, the noise factor for the overall optical amplifying section is reduced.

32 Claims, 4 Drawing Sheets

DISPERSION COMPENSATING FIBER AND OPTICAL AMPLIFIER USING SAME

BACKGROUND OF THE INVENTION

1. Field of the Invention

The present invention relates to a dispersion compensating fiber doped with a rare-earth element, and to an optical amplifying apparatus using the dispersion compensating fiber. In particular the invention relates to a dispersion compensating fiber with a limited rare-earth element doped region, and to an optical amplifying apparatus using this dispersion compensating fiber.

2. Description of the Related Art

In optical communication systems, for example, an optical transmission path comprising a single mode optical fiber (SMF) with zero dispersion in the vicinity of a wavelength of 1.3 $\mu$m is used. Hence in the case where light with a central wavelength in the 1.55 $\mu$m band is transmitted over long distances, there is a dispersion of around 18 ps/nm/km in the transmission path with respect to this 1.55 $\mu$m band light, with the problem that when the signal is transmitted at high transmission speeds, the waveform becomes distorted.

To solve this problem, then for example there is a method wherein dispersion exactly opposite to the dispersion produced in the transmission path is given to the transmitted signal to thereby effect compensation. For the means for this dispersion compensation, for example, a dispersion compensating fiber (DCF) or a fiber grating or the like is generally used. In particular, the dispersion compensating fiber provides an excellent dispersion compensation device from the point of reliability, and stability with respect to external influences, and that dispersion slope can also be compensated. Such a dispersion compensating fiber can be obtained by changing the refractive index profile or the relative index difference, or the core diameter or the like of a single mode optical fiber.

Figure 6:
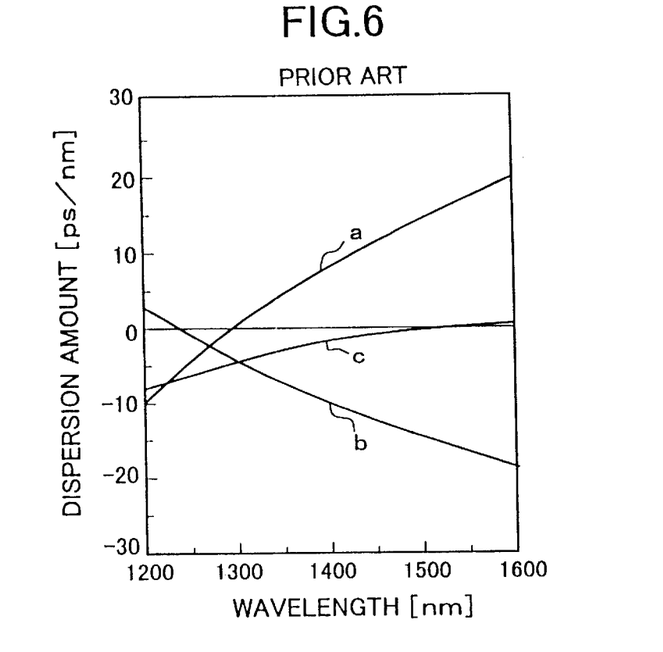
FIG. 6 is a diagram showing an example of dispersion characteristics of a conventional slope compensation type dispersion compensating fiber.

FIG. 6 shows an example of dispersion characteristics of a slope compensation type dispersion compensating fiber.

In FIG. 6, for example, "a" indicates the dispersion characteristic of a single mode optical fiber having a length of 1 km (zero dispersion wavelength 1.3 $\mu$m), while "b" indicates the dispersion characteristic of a dispersion compensating fiber having a length of 0.2 km. The single mode optical fiber has a positive dispersion slope with respect to an increase in wavelength, while the dispersion compensating fiber has a negative dispersion slope. The dispersion characteristic for the sum of the respective dispersion amounts is indicated by "c", showing a comparatively flat dispersion slope with the dispersion becoming zero in the vicinity of a wavelength of 1.55 $\mu$m.

If a dispersion compensating fiber having such a dispersion characteristic is inserted into an optical transmission path, then the dispersion characteristic for the whole of the optical transmission path can be controlled to give a characteristic where the dispersion amount is approximately zero in the 1.55 $\mu$m band, thereby obtaining a transmission signal with wave form distortion removed.

As an optical amplifying apparatus using a conventional dispersion compensating fiber, for example, the present applicant has proposed a device wherein a dispersion compensating fiber is inserted between two stage optical fiber amplifiers (refer to Japanese Patent Application No. 9-113882, or "Wideband Er-Doped Fiber Amplifiers for WDM Systems and Their Applications to Ultra Large Capacity Optical Transmission Experiments", Laser Research, vol. 2, No. 25, February 1997).

However in using a dispersion compensating fiber, there are many problems. One problem is that a dispersion compensating fiber has comparatively large insertion losses and these losses change according to the dispersion amount to be compensated. Another problem is that with a dispersion compensating fiber, since the mode field diameter is small, non-linear effects are more likely to arise than with normal transmission path optical fibers, so that if light is input at high power, the signal waveform deteriorates.

Regarding the former problem, a technique has been proposed to compensate for the losses due to dispersion compensating fibers, for example, by doping with a rare-earth element such as Erbium (Er) along the whole length of the core region of the dispersion compensating fiber, and supplying excitation light to this dispersion compensating fiber, to give an optical amplifying effect. Conventional techniques of this type are known for example from Japanese Unexamined Patent Publication Nos. 3-211530 and 6-11620.

With an optical communication system for transmitting signal lights over long distances, in order to compensate for the dispersion characteristics of the light transmission path, a relatively long distance dispersion compensation fiber is required. However if the insertion losses of such a long dispersion compensation fiber are compensated by the abovementioned conventional Er (or the like) doped dispersion compensating fiber, the following problems arise.

In the Er (or the like) doping region (the full length of the core region of the dispersion compensating fiber), in order to effectively obtain the optical amplifying effect, an excitation light of sufficiently high power must be supplied to the dispersion compensating fiber. For example, FIG. 7 shows aspects of the change in the signal light power inside a dispersion compensating fiber for the case where excitation light of differing power is supplied from the rear (output) side of a conventional dispersion compensating fiber which is doped with Er along the full length of the core region.

Figure 7:
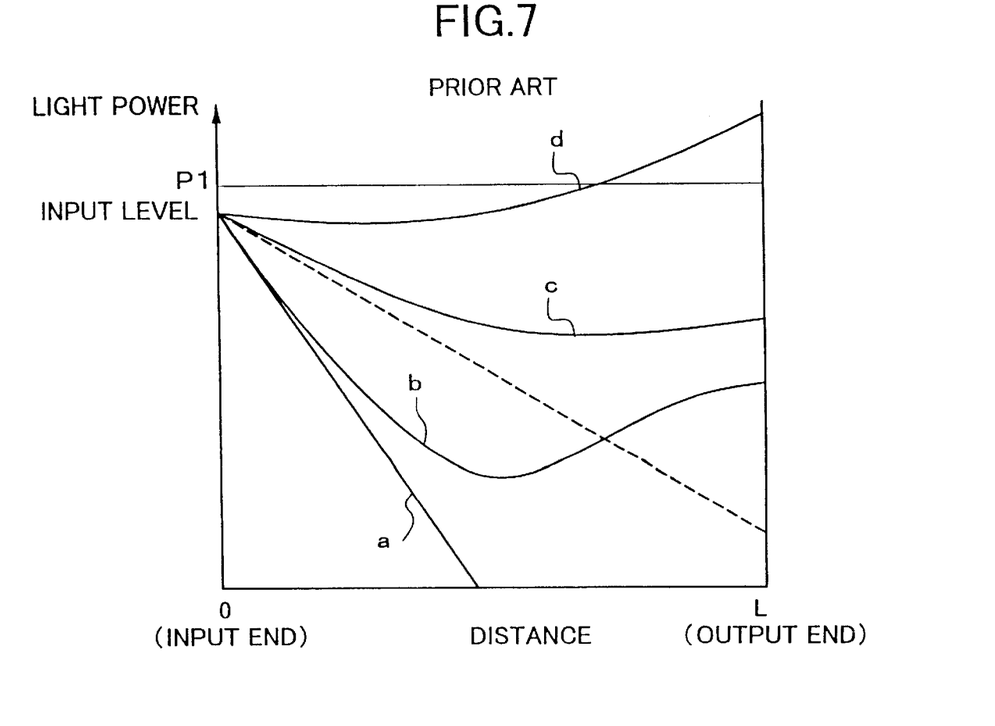
FIG. 7 is a diagram showing aspects of changes in power of the signal light inside a conventional dispersion compensating fiber which is doped with Er over the full length.

In FIG. 7, the abscissa axis shows the distance from the input end of the dispersion compensating fiber, while the ordinate axis shows the light power level. Moreover, level P1 is the threshold value for the input light power at which non-linear effects are produced in the dispersion compensating fiber. The signal light power for when excitation light is not supplied changes as shown by curve "a". As can be seen by comparing this with the change for the case of a normal dispersion compensating fiber which is not doped with Er (or the like) (dotted line), the inherent insertion losses for the Er (or the like) doped dispersion compensating fiber are greater than the insertion losses for the fiber which is not doped with Er (or the like).

The signal light power for when low power excitation light is supplied changes as shown by curve "b". In order to obtain the optical amplifying effect due to the induced emission phenomena from doping with Er (or the like), the power of the excitation light must be more than a certain level. However, since the excitation light incident from the rear is attenuated while being transmitted to the front inside the dispersion compensating fiber, then even with provision of the optical amplifying effect on the output side of the dispersion compensating fiber, along the way the signal light loses the amplification and is significantly attenuated. Therefore, if the power of the excitation light is low, the insertion losses of the dispersion compensating fiber cannot be sufficiently compensated.

In the case where high power excitation light is supplied so as to obtain the optical amplifying effect along the whole length of the dispersion compensating fiber, the signal light power changes as shown by curve "c". If such excitation light is sent to the dispersion compensating fiber, then the insertion losses of the dispersion compensating fiber can be compensated.

However, it is not easy to obtain an excitation light source of high output power. Moreover, doping with Erbium (or the like) along the whole length of the dispersion compensating fiber also has the disadvantage of high manufacturing costs.

Furthermore, even if an excitation light source of high output power is obtainable, if the power is excessive, then as shown by curve "d" in FIG. 7, because the signal light is amplified while the power level is comparatively high, the signal light power can exceed the level P1. In this case, there is the problem that non-linear effects occur so that the signal waveform deteriorates.

SUMMARY OF THE INVENTION

The present invention addresses the above problems, with the object of providing a dispersion compensating fiber doped with a rare-earth element, wherein the insertion losses can be sufficiently compensated even if the power of the excitation light is comparatively low. Moreover, it is an object to provide an optical amplifying apparatus incorporating a dispersion compensation function through employing such a dispersion compensating fiber, and also having excellent noise characteristics and the like.

Accordingly, the dispersion compensating fiber of the present invention has a dispersion characteristic which is opposite to a dispersion characteristic of an optical transmission path, and has a doped region limited to a predetermined range of the full length of the fiber and doped with a rare-earth element for providing an amplifying band by means of optical pumping.

With such a dispersion compensating fiber, when light which has been affected by the dispersion characteristics of the optical transmission path is input thereto, the dispersion in the optical transmission path is compensated as the input light passes along the full length of the fiber. Moreover, by supplying excitation light to this dispersion compensating fiber, thereby placing the doped region in a inverted population condition, when the light input to the dispersion compensating fiber passes through the doped region, this is amplified by the induced emission effect, thereby compensating for the insertion losses in the dispersion compensating fiber. This doped region is preferably limited to a predetermined range on the output side with respect to the full length of the fiber, so that compensation for the insertion losses is carried out using an excitation light of comparatively low power. The output side with respect to the full length of the fiber includes the region covering from the central portion to the output end. Moreover, regarding the doped region limited to the predetermined range, the rare-earth element may be doped over the whole of this predetermined range, or partially within the predetermined range.

Furthermore, with the optical amplifying apparatus of the present invention, this may comprise; a dispersion compensating fiber having a dispersion characteristic which is opposite to a dispersion characteristic of an optical transmission path, and having a doped region limited to a predetermined range of the full length of the fiber and doped with a rare-earth element for providing an amplifying band by means of optical pumping, at least one pre-stage optical amplifying device provided on a pre-stage side of the dispersion compensating fiber, at least one post-stage optical amplifying device provided on a post-stage side of the dispersion compensating fiber, and an excitation light supply device for supplying excitation light to the dispersion compensating fiber.

With such an optical amplifying apparatus, the light from the optical transmission path is amplified by the pre-stage optical amplifying device, and then sent to the dispersion compensating fiber. The excitation light from the excitation light supply device is sent to the dispersion compensating fiber, and the output light from the pre-stage optical amplifying device is passed through the dispersion compensating fiber, to thereby carry out compensation for dispersion in the optical transmission path and compensation for insertion losses of the dispersion compensating fiber. By carrying out compensation for the insertion losses of the dispersion compensating fiber, then light having a high input power level is sent to the post-stage optical amplifying device, and amplified light in which the influence of noise has been reduced is output from the post-stage optical amplifying device.

Furthermore, with the optical amplifying apparatus, this may further comprise a level adjustment device for adjusting an input power level to the dispersion compensating fiber, and a level control device for controlling the level adjustment device to make the output power level from the dispersion compensating fiber approximately constant.

With such a construction, then even if the power of the light output from the pre-stage optical amplifying device fluctuates, the power level of the output light from the dispersion compensating fiber is controlled to be approximately constant. Therefore, the optical amplifying apparatus has a wide input dynamic range.

In addition, the abovementioned optical amplifying apparatus may comprise a gain control device for controlling gain of the pre-stage optical amplifying device to be approximately constant. By providing the gain control device, then even if the input power level to the pre-stage optical amplifier fluctuates, amplified light with maintained flatness of the gain for each wavelength, is output.

Moreover, the excitation light supply device preferably supplies excitation light from an output side of the dispersion compensating fiber. By supplying excitation light from the output side (rear) of the dispersion compensating fiber, the insertion losses of the dispersion compensating fiber can be compensated by excitation light of lower power.

DESCRIPTION OF THE PREFERRED EMBODIMENTS

As follows is a description of embodiments of the invention with reference to the drawings.

Figure 1:
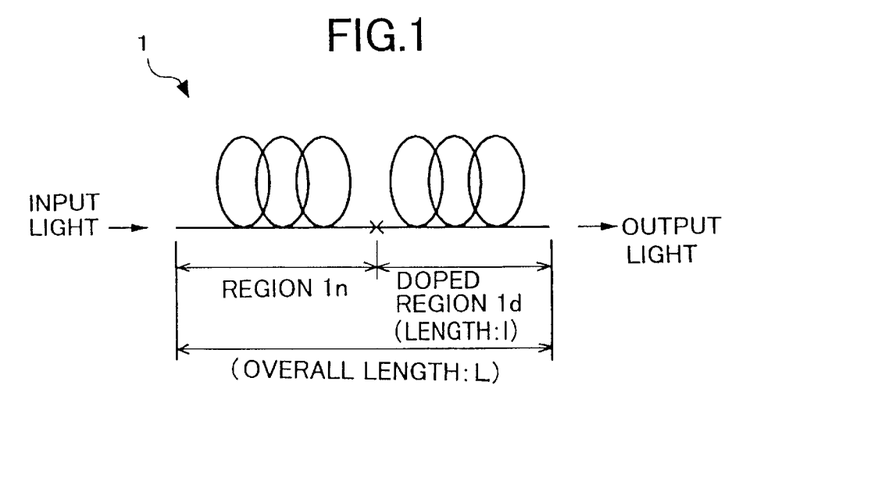
FIG. 1 is a diagram illustrating the construction of a dispersion compensating fiber of an embodiment of the present invention.

FIG. 1 shows the construction of a dispersion compensating fiber of an embodiment according to the present invention.

In FIG. 1, a dispersion compensating fiber 1 of the embodiment is made for example from one piece of dispersion compensating fiber material of overall length L, and is formed with a doped region 1d limited to a range of length I (I<L) from an output side end (right end in FIG. 1) of the dispersion compensating fiber material and doped for example with a rare-earth element such as Erbium (Er). A region on the input side (left side in FIG. 1) which is not doped with Er or the like is indicated by 1n.

The dispersion compensating fiber material is, for example, one having a similar dispersion characteristic to the dispersion characteristic "b" shown in FIG. 7. Such a dispersion characteristic is substantially the same over the region 1n and the doped region 1d. The overall length L is determined according to the dispersion amount in the optical transmission path for which the dispersion compensation is to be carried out.

FIG. 2 shows an example of the cross-section construction, and the refractive index profile in the doped region 1d.

Figure 2A:
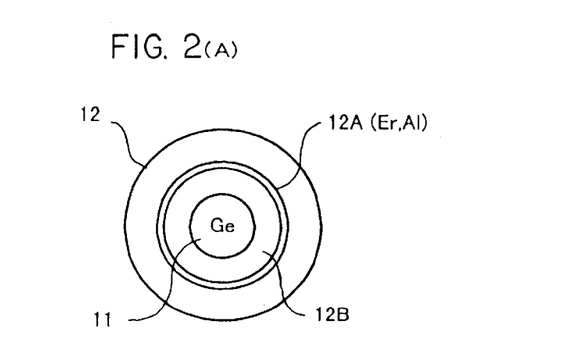
FIG. 2 is diagram showing an example of a cross-sectional construction and refractive index profile of a doped region of the embodiment of FIG. 1.
Figure 2B:
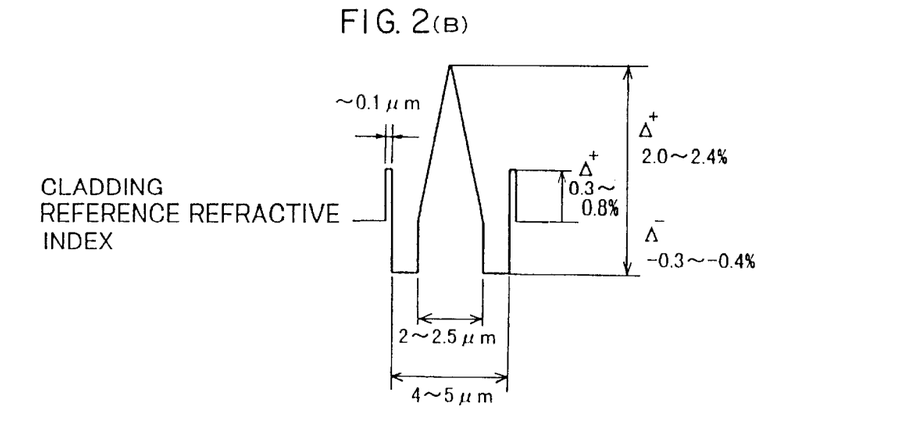

With the cross-sectional view of FIG. 2(A), the doped region 1d has, for example, a core 11 and a cladding 12 comprising silica ($SiO_2$) or the like as the main ingredient, with the cladding 12 surrounding the core 11. The glass composition of the core 11 includes Germanium (Ge) as a dopant for increasing the refractive index. The glass composition of the cladding 12 has; a region 12A which is doped with Erbium (Er) for providing an amplifying band by means of optical pumping, and aluminum (Al) for enlarging the amplifying band, and a region 12B disposed between the region 12A and the core 11 which does not include dopant and in which the impurity concentration is low. The refractive index of the core 11, as shown in FIG. 2(B), is much higher than the refractive index of the cladding 12 due to being doped with Ge, moreover, increases towards the center of the core 11. The appended respective values for the refractive index indicate the difference relative to a reference refractive index of the cladding.

The doped fiber of the abovementioned construction is described in detail, for example, in Japanese Unexamined Patent Publication No. 9-197131, and hence detailed description is here omitted. In this publication, doped fibers of various constructions other than the above construction are also disclosed, and these are all applicable to the present embodiment. However the doped fibers described in the above publication use a normal fiber material, and not a dispersion compensating fiber as with the present embodiment. Therefore, attention must be given to differences in Er doping concentrations and core diameters etc.

Regarding the cross-section construction of the region 1n of the dispersion compensating fiber material, the only point that differs is that in FIG. 2(A), the Er and Al doped region 12A of the cladding 12 does not exist, other details being the same as the cross-sectional construction of the doped region 1d.

With the region 1n and the doped region 1d of the dispersion compensating fiber material, for example, one dispersion compensating fiber which is not doped with Er and Al and one dispersion compensating fiber which is doped with Er and Al can be spliced together to give one dispersion compensating fiber material. In this way, the manufacturing of the dispersion compensating fiber doped with Er or the like is much simpler than heretofore.

Next is a description of the operation of the dispersion compensating fiber of the above construction.

Here, for example, the case is considered where excitation light is supplied from the rear side of the present dispersion compensating fiber to compensate for the insertion losses. Aspects of the change in the signal light power inside the dispersion compensating fiber for this case are shown in FIG. 3.

Figure 3:
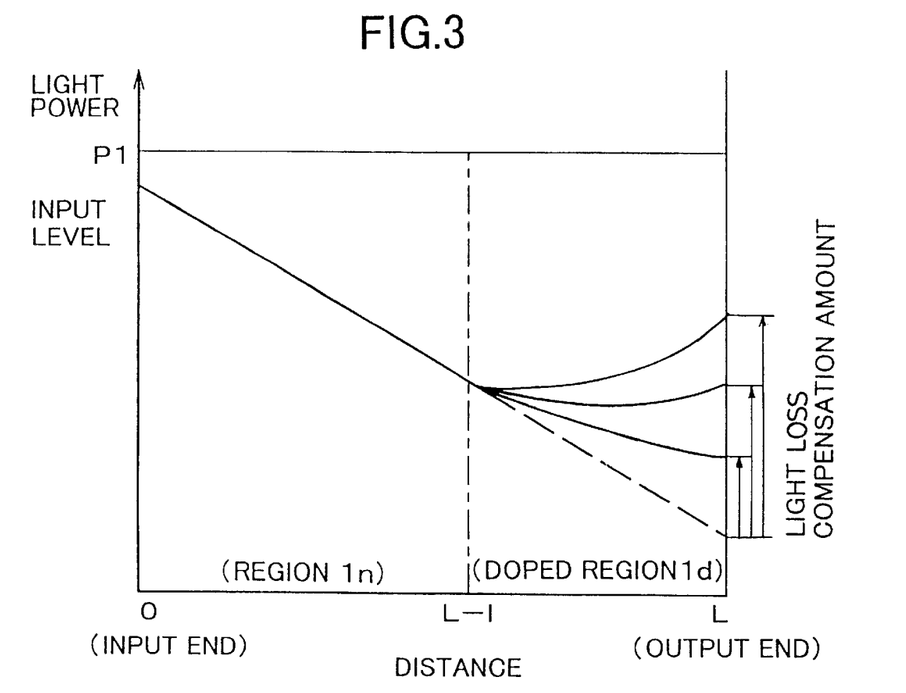
FIG. 3 is a diagram showing aspects of changes in power of the signal light inside the dispersion compensating fiber of the embodiment of FIG. 1.

As shown in FIG. 3, with the present dispersion compensating fiber, the range which has the optical amplifying effect is the output side doped region 1d only. Therefore, even with an excitation light of comparatively low power compared to the power of the excitation light supplied to the conventional dispersion compensating fiber, an optical amplifying effect can be effectively obtained inside the doped region 1d. That is to say, with the conventional case, in order to prevent an abrupt drop in the signal light level on the input side of the dispersion compensating fiber, it is necessary to obtain an optical amplifying effect over practically the whole length of the dispersion compensating fiber. On the other hand, with the present dispersion compensating fiber, since the region 1n is not doped with Er (or the like), the losses on the input side are small compared to the conventional case, so that sufficient compensation for the insertion losses is possible even if the optical amplifying effect is obtained in the doped region 1d only. FIG. 3, respectively shows the aspects of the signal light power for when the optical loss compensation amount is changed.

Furthermore, since the signal light which has been attenuated to a certain extent inside the region 1n is amplified in the doped region 1d, it is easy to control the power level of the signal light so as to not exceed the level P1 at which the non-linear effects are produced.

With the abovementioned embodiment, the description has been given for the case where the doped region 1d is formed in a range of length I from the output side end of the dispersion compensating fiber. However, the location of the doped region of the present invention is not limited to this. For example the doped region may be formed in an intermediate portion of the dispersion compensating fiber. In this case however, the doped region is preferably located as much as possible to the output side. If as with the abovementioned embodiment, the doped region 1d is formed from the output side end, there is the advantage that the number of places where this is spliced to the region which is not doped with Er (or the like) can be kept to a minimum.

Next is a description of an embodiment of an optical amplifying apparatus which uses the abovedescribed dispersion compensating fiber.

Figure 4:
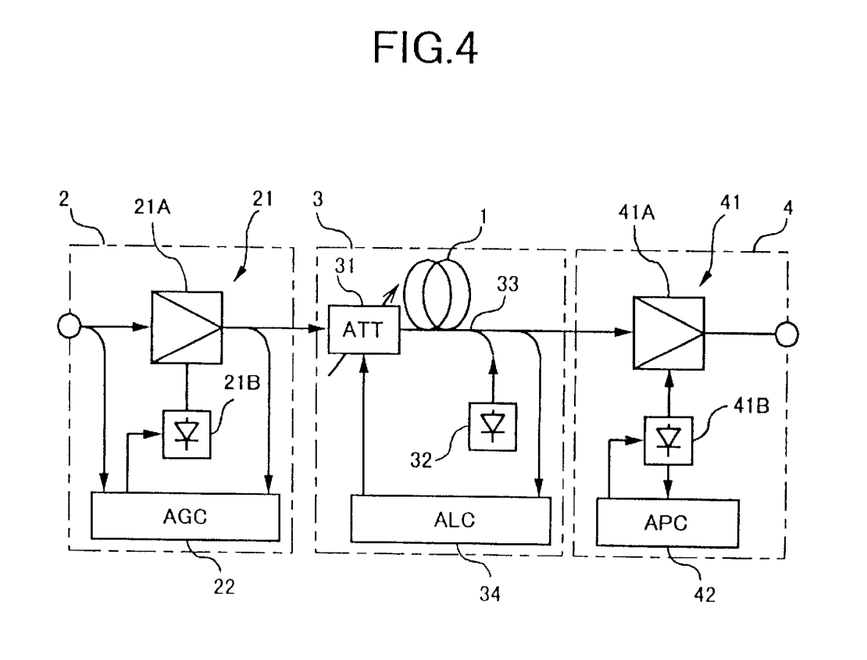
FIG. 4 is a block diagram showing the construction of an optical amplifying apparatus of the embodiment of the present invention.

FIG. 4 is a block diagram showing the construction of an optical amplifying apparatus of the embodiment.

In FIG. 4, the optical amplifying apparatus comprises, for example, a pre-stage optical amplifying section 2 for amplifying wavelength multiplexed input light, a dispersion compensation section 3 incorporating the abovementioned dispersion compensating fiber 1, and a post-stage optical amplifying section 4 which takes and amplifies the light output from the pre-stage amplifying section 2 via the dispersion compensation section 3.

The pre-stage amplifying section 2 comprises, for example, an optical fiber amplifier 21 as a pre-stage amplifying device, and an automatic gain control (AGC) circuit 22 as a gain control device. The optical fiber amplifier 21 employs, for example, an Er-doped optical fiber (EDF) 21A (or the like) which includes aluminum (Al) in high concentration. Excitation light from an excitation light source 21B is supplied to the EDF 21A via an optical coupler (not shown in FIG. 4). The wavelength of the excitation light is here for example 980 nm to obtain low noise characteristics. The AGC circuit 22 is one which monitors the input/output light to the optical fiber amplifier 21, and controls the gain of the optical fiber amplifier 21 to be approximately constant. By providing such an AGC circuit 22, then even if the input power level fluctuates, flatness of the gain with respect to the wavelength is maintained. Here, while not shown in FIG. 4, an optical filter for removing high noise light power in the 1530 nm band produced by the EDF 21A, can be provided as required on the output side of the optical fiber amplifier 21.

The dispersion compensation section 3 comprises; a variable light attenuator (ATT) 31 as a level adjustment device for adjusting the power level of the light from the pre-stage optical amplifying section 2, the abovementioned dispersion compensating fiber 1 into which is input the light passed through the variable light attenuator 31, an excitation light source 32 for generating excitation light for the dispersion compensating fiber 1, an optical coupler 33 provided for example on the rear side of the dispersion compensating fiber 1 for supplying the excitation light to the dispersion compensating fiber 1, and an automatic level control (ALC) circuit 34 as a level control device for controlling the power level of the output light from the dispersion compensating fiber 1 to be approximately constant. Here the excitation light source 32 and the optical coupler 33 have the function of an excitation light supply device.

By using an optical attenuator having a variable range of a sufficiently wide attenuation amount for the variable light attenuator 31, then a wide input dynamic range for the optical amplifying apparatus is realized. The dispersion compensating fiber 1 has an overall length L depending on the dispersion amount in the optical transmission path connected to the optical amplifying apparatus. The length I of the doped region 1d depends on the compensation amount of the insertion loss (optical loss compensation amount) in the dispersion compensating fiber 1, and is set taking into consideration the dopant concentration of the Er, and the excitation light power. For the wavelength of the excitation light to the dispersion compensating fiber 1, for example, a wavelength of around 980 nm is used. The ALC circuit 34 controls the attenuation amount of the variable light attenuator 31 in accordance with the power of the output light from the dispersion compensating fiber 1. By providing the ALC circuit 34, then the output level of the respective channels for input to the post-stage optical amplifying section 4 can be continually maintained approximately constant.

The post-stage optical amplifying section 4 comprises, for example, an optical fiber amplifier 41 as a post-stage optical amplifying device, and an automatic power control (APC) circuit 42. The optical fiber amplifier 41 employs for example, an EDF 41A (or the like) which includes Al in a high concentration. Excitation light from an excitation light source 41B is supplied to the EDF 41A via an optical coupler (not shown in FIG. 4). The wavelength of the excitation light is here for example 1480 nm to obtain a high output. The APC circuit 42 is one for controlling the operating conditions of the excitation light source 41B so that the excitation light power is constant. Here, while not shown in FIG. 4, an optical filter for removing high noise light power in the 1530 nm band produced by the EDF 41A can be provided as required on the output side of the optical fiber amplifier 41.

Next is a description of the operation of the optical amplifying apparatus.

At first, the input signal light which has been wavelength is suitably amplified multiplexed by the low noise pre-stage optical amplifying section 2. At this time, since the gain of the optical fiber amplifier 21 is controlled by the automatic gain control (AGC) circuit 22 to be approximately constant, then even if the input power level fluctuates, light for which the flatness of the gain for each respective wavelength has been maintained is output. The signal light from the pre-stage amplifying section 2 is then sent via the variable light attenuator 31 to the dispersion compensating fiber 1. With the dispersion compensating fiber 1, the excitation light generated by the excitation light source 32 is input to the rear side end (the doped region 1d) via the optical coupler 33, so that the doped region 1d attains the inverted population condition. The signal light input to the dispersion compensating fiber 1 passes through the region 1n and the doped region 1d so that the dispersion in the light transmission path is compensated, thereby eliminating waveform distortion. Moreover, at the time of passing through the doped region 1d, this is amplified by the induced emission effect, and the insertion losses are compensated by a predetermined amount (optical loss compensation amount).

The signal light output from the dispersion compensating fiber 1 is sent to the post-stage optical amplifying section 4, and a part thereof is sent to the ALC circuit 34. The ALC circuit 34 monitors the power level of the output light from the dispersion compensating fiber 1, and controls the attenuation amount of the variable light attenuator 31 so that the power level becomes approximately constant. The power level of the output light from the dispersion compensating fiber 1 is set taking into consideration the noise characteristics of the post-stage optical amplifying section 4 as described later.

With the post-stage optical amplifying section 4, the excitation light, the power of which has been controlled to be approximately constant by the APC circuit 42, is supplied to the optical fiber amplifier 41. The optical fiber amplifier 41 then amplifies the signal light from the dispersion compensation section 3, and outputs this to the outside as the output signal light of the optical amplifying apparatus.

The operation for optical loss compensation in the dispersion compensating fiber 1 will now be specifically described.

In general, the noise factor (NF) of an optical amplifying apparatus of a two stage construction, can be expressed by the following relational equation:

$$NF_0\ NF_1 + NF_2 \times (p_1/p_2)$$

where the overall noise factor of the optical amplifying apparatus is $NF_0$, the noise factor of the pre-stage and post-stage optical amplifying sections is $NF_1$, $NF_2$ respectively, and the power of the input light to the pre-stage and post-stage optical amplifying sections is $p_1$, $p_2$ respectively.

With a construction wherein a dispersion compensating fiber is not included between the pre-stage and post-stage optical amplifying sections, the gain of the pre-stage optical amplifying section is made sufficiently large so that the power $p_2$ of the input light to the post-stage optical amplifying section becomes high. Hence the noise factor of the post-stage optical amplifying section becomes a level which can be disregarded. However, in the case where a dispersion compensating fiber having large insertion losses is inserted between the two stage optical amplifying sections, the power $p_2$ of the input light to the post-stage optical amplifying section becomes low, and hence the influence of the noise in the post-stage optical amplifying section becomes significant, so that the noise factor $NF_0$ of the optical amplifying apparatus worsens. Therefore, if as with the present embodiment, the losses in the dispersion compensating fiber 1 are compensated so that the level of the signal light input to the post-stage optical amplifying section 4 becomes high, the influence of the noise in the post-stage optical amplifying section 4 can be reduced.

While, it is considered that when the optical loss compensation amount in the dispersion compensating fiber 1 is large, then the influence of the noise light (ASE: amplified spontaneous emission) produced in the doped region 1d also becomes large. For example, when the optical loss compensation amount in the dispersion compensating fiber 1 is changed, more specifically, in the case for example where the doping concentration of the Er is changed to make the excitation light approximately constant at around 200 mW, then in calculating the noise factor of the single dispersion compensating fiber 1, when the optical loss compensation amount is set to 2 dB, 3 dB, 4 dB, the noise factor increases as 3.5 dB, 4.8 dB, 5.8 dB respectively.

However, by increasing the optical loss compensation amount in the dispersion compensating fiber 1, then even though the noise in the single dispersion compensating fiber 1 increases, since the noise reduction effect due to the increase in the power level of the input light to the post-stage optical amplifying section 4 increases even more, the noise factor for the overall optical amplifying apparatus drops. Moreover, as above, in calculating the noise factor in the overall optical amplifying apparatus for when the optical loss compensation amount is changed, when the optical loss compensation amount is 0 dB (no doped region) 2 dB, 3 dB, 4 dB, the noise factor reduces as 8.7 dB, 7.8 dB, 7.2 dB, 6.7 dB respectively.

By compensating for the losses in the dispersion compensating fiber 1 and increasing the power of the input light to the post-stage optical amplifying section 4 in this way, then an optical amplifying apparatus with excellent noise characteristics can be realized.

Moreover, by using a dispersion compensating fiber 1 formed with a doped region 1d on the output side only, then as described above, compared to the case where the whole of the dispersion compensating fiber is doped with Er as heretofore, the output power level of the excitation light source 32 can be reduced, and also control for amplifying the signal light so that non-linear effects are not produced in the dispersion compensating fiber 1 can be simplified.

Next, as a description of another embodiment of an optical amplifying apparatus according to the present invention, a description is given for the case where the dispersion compensating fiber of the present invention is applied to the optical amplifying apparatus disclosed in the abovementioned prior application of the present applicant (Japanese Patent Application No. 9-113882).

Figure 5:
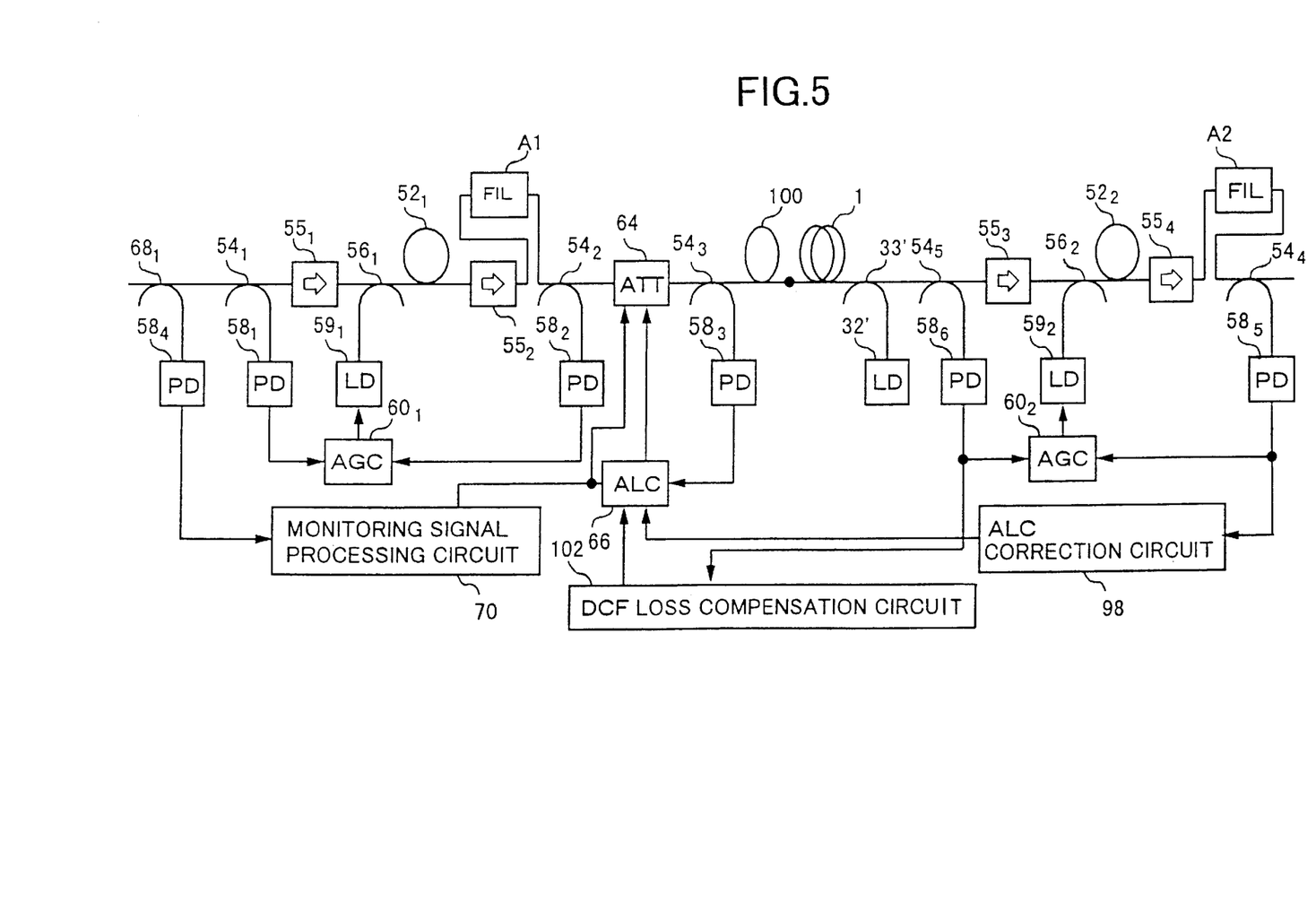
FIG. 5 is a block diagram showing the construction of an optical amplifying apparatus of another embodiment of the present invention.

FIG. 5 is a block diagram illustrating the construction of the optical amplifying apparatus of the abovementioned another embodiment.

In FIG. 5, the part where this optical amplifying apparatus differs from the optical amplifying apparatus in the prior application is that the dispersion compensating fiber 1 illustrated in FIG. 1 is provided on the output side of a normal dispersion compensating fiber 100 used in the optical amplifying apparatus of the prior application, and excitation light from an excitation light source (LD) 32' is supplied from the rear side of the dispersion compensating fiber 1 via an optical coupler 33'. Other parts are the same as for the construction of the optical amplifying apparatus disclosed in the specification of the prior application and corresponding to FIG. 17 therein. Since the specific construction and operation is described in detail in the abovementioned specification, the construction corresponding to this prior application is appended with the same symbols, and only the outline is described.

In the optical amplifying apparatus, as with the abovementioned embodiment, wavelength multiplexed input signal light is sent to an Er-doped fiber $52_1$ to which excitation light is supplied from an excitation light source $59_1$, and amplified. With a pre-stage optical amplifying section of this apparatus, the gain is controlled to be constant by an AGC circuit 60. Furthermore, here one part of the input signal light is divided by an optical coupler $68_1$, converted by a photodiode (PD) $58_4$ into an electrical signal, and then sent to a monitoring signal processing circuit 70. The monitoring signal processing circuit 70 is a circuit for stopping the operation of a variable attenuator (ATT) 64 when a control signal included in the branched input signal for notifying a modification of a channel number is extracted and identified, to thereby limit an abrupt change in the light signal level. The amplified signal light output from the Er-doped fiber $52_1$ passes through an optical isolator $55_2$ and an optical filter A1 and is sent to a variable attenuator 64. The optical filter A1 is for correcting the wavelength dependence of the gain.

With the signal sent to the variable attenuator 64, once the light signal level has been adjusted under control of the ALC circuit 66, then at first this is sent to the normal dispersion compensating fiber 100 and predetermined dispersion compensation is carried out. The signal light passed through the dispersion compensating fiber 100 is then sent to the dispersion compensating fiber 1 to which excitation light from the excitation light source 32' is supplied from the rear side, and subjected to dispersion compensation and optical amplification. The signal light output from the dispersion compensating fiber 1 is then sent to a post-stage optical amplifying section via an optical isolator $55_3$, and part thereof is branched by an optical coupler $54_5$, converted by a photodiode $58_6$ into an electrical signal, and then sent to a DCF loss compensation circuit 102 and an AGC circuit $60_2$. The DCF loss compensation circuit 102 is a circuit provided for compensating for the insertion losses of the dispersion compensating fiber 100.

Here the dispersion compensation is carried out in two separate stages. However the dispersion compensating fiber 100 may be omitted and all of the dispersion compensation carried out in one dispersion compensating fiber 1. In this case, the DCF loss compensation circuit 102 may be omitted. Moreover, the dispersion compensating fiber 1 is provided on the output side of the dispersion compensating fiber 100. However, the dispersion compensating fiber 1 may be provided on the input side. When provided on the output side, then the optical isolator $55_3$ of the post-stage optical amplifying section can be used in common for preventing unstable operation (for example oscillation etc.) of the dispersion compensating fiber 1 due to reflected/returning light. However, when provided on the input side, it is necessary to provide a special optical isolator between the output from the dispersion compensating fiber 1 and the input to the dispersion compensating fiber 100, to block the reflected/returning light due to Rayleigh scattering or the like in the dispersion compensating fiber 100.

The signal light sent to the post-stage optical amplifying section is amplified by an Er-doped fiber $52_2$ to which excitation light is supplied from an excitation light source $59_2$, and then output via an optical coupler $54_4$ and an optical filter A2. The optical filter A2 is the same as the optical filter A1. Furthermore, part of the output signal light is divided by the optical coupler $54_4$, converted by a photodiode $58_5$ into an electrical signal, and then sent to the AGC circuit $60_2$ and an ALC correction circuit 98. The ALC correction circuit 98 is a circuit for determining if the whole optical output power is being maintained within a predetermined range.

In this way, by applying the dispersion compensating fiber 1 of the present invention to the optical amplifying apparatus disclosed in the prior application, it is possible to improve the noise characteristics.

With the abovementioned respective embodiments, the case has been described where excitation light is supplied from the rear side of the dispersion compensating fiber 1. However, the present invention is not limited to this, and the construction may be such that the excitation light is supplied from the front (input) side of the dispersion compensating fiber. In this case however, since the excitation light is attenuated while passing through the region $1n$, then a higher excitation light power than for when supplied from the rear is necessary.

Moreover, the construction has the dispersion compensating fiber provided between the two stage optical amplifying sections. However, in a similar manner to this, an application is also possible where a dispersion compensation section using a dispersion compensating fiber having a doped region is provided in an optical amplifying apparatus with a three or more stage construction. Of course, in the case of a construction with a single optical amplifying section, the dispersion compensation section may be connected to either the input side or the output side of the optical amplifying section.

EFFECT OF THE INVENTION

As described above, with the dispersion compensating fiber of the present invention, by having the doped region limited to a predetermined range with respect to the overall length of the core region of the fiber, then the range having the optical amplifying effect is limited. In particular, in the case where the doped region is limited to the output side of the fiber, then even with an excitation light of comparatively low power compared to heretofore, it is possible to effectively have an optical amplifying effect in the doped region. Moreover, since the light attenuated in the region of the input side which is not doped with the rare-earth element is amplified in the doped region, it is easy to control of the optical amplifying effect so that the power level of the light passing through the dispersion compensating fiber does not exceed the level at which the non-linear effects are produced.

Furthermore, with the optical amplifying apparatus using the dispersion compensating fiber of the present invention, by providing a dispersion compensating fiber into which is input the excitation light from the excitation light supply device, between the pre-stage and post-stage optical amplifying devices, light of a high power level is input to the post-stage optical amplifying device. Therefore an optical amplifying apparatus with excellent noise characteristics can be provided.

Moreover, by providing a level adjustment device and a level control device for the optical amplifying apparatus, then even if the power of the output light from the pre-stage optical amplifying device fluctuates, the power of the output light from the dispersion compensating fiber is controlled to be approximately constant. Therefore, an optical amplifying apparatus with a wide input dynamic range can be provided.

In addition, by providing a gain control device for the pre-stage optical amplifying device, then even if the input power level fluctuates, amplified light for which the flatness of the gain for each wavelength has been maintained, can be output. This is particularly effective for the case of amplifying wavelength multiplexed light.

Furthermore, by supplying excitation light to the dispersion compensating fiber from the output side, the power of the excitation light can be made even lower.

What is claimed is:

1. A dispersion compensating fiber having a dispersion characteristic which is opposite to a dispersion characteristic of an optical transmission path, and having a doped region limited to a predetermined range narrower than the full length of the fiber and doped with a rare-earth element for providing an amplifying band by means of optical pumping.

2. An optical amplifying apparatus comprising:

a dispersion compensating fiber having a dispersion characteristic opposite to an optical transmission path dispersion characteristic, and a doped region limited to a predetermined range narrower than the full length of the fiber and doped with a rare-earth element for providing an amplifying band by means of optical pumping;

at least one pre-stage optical amplifying means provided on a pre-stage side of said dispersion compensating fiber;

at least one post-stage optical amplifying means provided on a post-stage side of said dispersion compensating fiber; and excitation light supply means for supplying excitation light to said dispersion compensating fiber.

3. An optical amplifying apparatus according to claim 2 further comprising:

level adjustment means for adjusting an input power level to said dispersion compensating fiber; and level control means for controlling said level adjustment means to make the output power level from said dispersion compensating fiber approximately constant.

4. An optical amplifying apparatus according to claim 2, further comprising:

gain control means for controlling gain of said prestage optical amplifying means to be approximately constant.

5. An optical amplifying apparatus according to claim 2, wherein said excitation light supply means supplies excitation light from an output side of said dispersion compensating fiber.

6. An optical amplifying apparatus according to claim 3, further comprising:

gain control means for controlling gain of said prestage optical amplifying means to be approximately constant.

7. An optical amplifying apparatus according to claim 3, wherein said excitation light supply means supplies excitation light from an output side of said dispersion compensating fiber.

8. An optical amplifying apparatus according to claim 4, wherein said excitation light supply means supplies excitation light from an output side of said dispersion compensating fiber.

9. A dispersion compensating fiber having a dispersion characteristic which is opposite to a dispersion characteristic of an optical transmission path, and having a doped region limited to a predetermined range narrower than the full length of the fiber and doped with a rare-earth element for providing an amplifying band by optical pumping.

10. An optical amplifying apparatus comprising:

a dispersion compensating fiber having a dispersion characteristic opposite to an optical transmission path dispersion characteristic, and a doped region limited to a predetermined range narrower than the full length of the fiber and doped with a rare-earth element for providing an amplifying band via optical pumping;

a pre-stage optical amplifier provided on a pre-stage side of said dispersion compensating fiber;

a post-stage optical amplifier provided on a post-stage side of said dispersion compensating fiber; and a light source providing excitation light to said dispersion compensating fiber.

11. An optical amplifying apparatus according to claim 10 further comprising:

a level adjustor adjusting an input power level to said dispersion compensating fiber; and a level controller controlling said level adjustor to make the output power level from said dispersion compensating fiber approximately constant.

12. An optical amplifying apparatus according to claim 10, further comprising:

a gain controller controlling gain of said prestage optical amplifier to be approximately constant.

13. An optical amplifying apparatus according to claim 10, wherein said light source provides excitation light from an output side of said dispersion compensating fiber.

14. An optical amplifying apparatus according to claim 11, further comprising:

a gain controller controlling gain of said prestage optical amplifier to be approximately constant.

15. An optical amplifying apparatus according to claim 11, wherein said light source provides excitation light from an output side of said dispersion compensating fiber.

16. An optical amplifying apparatus according to claim 12, wherein said light source provides excitation light from an output side of said dispersion compensating fiber.

17. An apparatus comprising:

a dispersion compensating fiber having an input end and an output end, the fiber divided into a first portion extending from the input end towards the output end and having a length x and a second portion extending from the output end towards the input end and having a length (L–x) so that the fiber has a total length L from the input end to the output end, the fiber having a dispersion characteristic which is substantially the same along the entire length L of the fiber and which is opposite to a dispersion characteristic of an optical transmission path, the second portion being doped along the entire length (L–x) of the second portion with a rare-earth element for providing an amplifying band by optical pumping, the first portion not doped with the rare-earth element.

18. An apparatus comprising:

a multi-stage optical amplifier including a first optical amplifier optically amplifying a light signal, a dispersion compensating fiber having an input end and an output end so that the amplified light signal travels through the fiber from the input end to the output end thereby compensating for dispersion in the light signal, the fiber divided into a first portion extending from the input end towards the output end and having a length x and a second portion extending from the output end towards the input end and having a length (L–x) so that the fiber has a total length L from the input end to the output end, the fiber having a dispersion characteristic which is substantially the same along the entire length L of the fiber and which is opposite to a dispersion characteristic of an optical transmission path through which the light signal travels, the second portion being doped along the entire length (L–x) of the second portion with a rare-earth element for providing an amplifying band by optical pumping, the first portion not doped with the rare-earth element, and a second optical amplifier optically amplifying the dispersion compensated light signal.

19. An apparatus according to claim 18, wherein the multi-stage optical amplifier further includes a level adjustor adjusting a power level of the light signal as amplified by the first optical amplifier and before the amplified light signal travels into the input end of the fiber, and a level controller controlling the level adjustor to cause a power level of the dispersion compensated light signal after traveling through the output end of the fiber and before being amplified by the second optical amplifier to be approximately constant.

20. An apparatus according to claim 18, wherein the multi-stage optical amplifier further includes a gain controller controlling gain of the first optical amplifier to be approximately constant.

21. An apparatus according to claim 18, wherein the multi-stage optical amplifier further includes a light source providing excitation light to the fiber from the output end of the fiber so that the excitation light travels from the output end towards the input end.

22. An apparatus according to claim 19, wherein the multi-stage optical amplifier further includes a gain controller controlling gain of the first optical amplifier to be approximately constant.

23. An apparatus according to claim 19, wherein the multi-stage optical amplifier further includes a light source providing excitation light to the fiber from the output end of the fiber so that the excitation light travels from the output end towards the input end.

24. An apparatus according to claim 20, wherein the multi-stage optical amplifier further includes a light source providing excitation light to the fiber from the output end of the fiber so that the excitation light travels from the output end towards the input end.

25. An apparatus comprising:

a dispersion compensating fiber having an input end and an output end, the fiber having a dispersion characteristic which is substantially the same along the entire length of the fiber from the input end to the output end and which is opposite to a dispersion characteristic of an optical transmission path through which light traveling through the fiber also travels, a portion of the fiber less then said entire length being doped with a rare-earth element for providing an amplifying band by optical pumping.

26. An apparatus comprising:

a multi-stage optical amplifier including a first optical amplifier optically amplifying a light signal, a dispersion compensating fiber having an input end and an output end so that the amplified light signal travels through the fiber from the input end to the output end thereby compensating for dispersion in the light signal, the fiber having a dispersion characteristic which is substantially the same along the entire length of the fiber from the input end to the output end and which is opposite to a dispersion characteristic of an optical transmission path through which light signal also travels, a portion of the fiber less then said entire length being doped with a rare-earth element for providing an amplifying band by optical pumping, and a second optical amplifier optically amplifying the dispersion compensated light signal.

27. An apparatus according to claim 26, wherein the multi-stage optical amplifier further includes a level adjustor adjusting a power level of the light signal as amplified by the first optical amplifier and before the amplified light signal travels into the input end of the fiber, and a level controller controlling the level adjustor to cause a power level of the dispersion compensated light signal after traveling through the output end of the fiber and before being amplified by the second optical amplifier to be approximately constant.

28. An apparatus according to claim 26, wherein the multi-stage optical amplifier further includes a gain controller controlling gain of the first optical amplifier to be approximately constant.

29. An apparatus according to claim 26, wherein the multi-stage optical amplifier further includes a light source providing excitation light to the fiber from the output end of the fiber so that the excitation light travels from the output end towards the input end.

30. An apparatus according to claim 27, wherein the multi-stage optical amplifier further includes a gain controller controlling gain of the first optical amplifier to be approximately constant.

31. An apparatus according to claim 27, wherein the multi-stage optical amplifier further includes a light source providing excitation light to the fiber from the output end of the fiber so that the excitation light travels from the output end towards the input end.

32. An apparatus according to claim 28, wherein the multi-stage optical amplifier further includes a light source providing excitation light to the fiber from the output end of the fiber so that the excitation light travels from the output end towards the input end.

\* \* \* \* \*

UNITED STATES PATENT AND TRADEMARK OFFICE
CERTIFICATE OF CORRECTION

PATENT NO.:    6,163,398
DATED     :    December 19, 2000
INVENTOR(S):   Shinya INAGAKI, et al.

It is certified that an error appears in the above-identified patent and that said Letters Patent is hereby corrected as shown below:

On the title page:
  [56]   References Cited

FOREIGN PATENT DOCUMENTS change "0820258" to --080204258--.

Signed and Sealed this

First Day of May, 2001

Attest:

NICHOLAS P. GODICI

*Attesting Officer*   *Acting Director of the United States Patent and Trademark Office*